United States Patent Office 3,026,357
Patented Mar. 20, 1962

3,026,357
PREPARATION OF HEXAHYDROXY-CYCLODODECANE
Charles E. Scott, Drexel Hill, Pa., assignor to Sun Oil Company, Philadelphia, Pa., a corporation of New Jersey
No Drawing. Filed Oct. 22, 1959, Ser. No. 847,896
4 Claims. (Cl. 260—617)

This invention relates to the preparation of hexahydroxycyclododecane and more particularly to the preparation of such hexaol compound from cyclododecatriene-1,5,9.

It is known that cyclododecatriene-1,5,9 can be prepared by contacting butadiene with a catalyst formed from titanium tetrachloride and diethyl aluminum chloride in a hydrocarbon solvent. This catalyst system produces the trans-trans-cis form of the triene exclusively. It is also known that cyclododecatriene-1,5,9 can be prepared by contacting butadiene with a catalyst system which is aluminum triethyl together with either chromyl chloride or chromic chloride in a hydrocarbon solvent. The latter type of catalyst system produces mainly the trans-trans-trans form of the triene but also causes the formation of substantial amounts of the trans-trans-cis isomer.

The present invention is directed to the conversion of cyclododecatriene-1,5,9 into a derivative having two hydroxy groups attached at each double bond position in the ring, such derivative specifically being 1,2,5,6,9,10-hexahydroxycyclododecane. This product can be obtained from either the trans-trans-cis form or the trans-trans-trans form of the triene. The resulting compound when initially prepared is a very viscous, clear liquid which upon standing for a sufficient time becomes a glassy solid. It is soluble in water, acetone, alcohols such as methanol and ethanol, and esters such as ethyl acetate, and is essentially insoluble in benzene and ethyl ether.

According to the invention, cyclododecatriene-1,5,9 is reacted with performic acid in amount such that the molar ratio of performic acid to the triene exceeds 3 to 1. This effects reaction at each of the double bonds in the triene to form hydroxyl groups at the 1, 2, 5, 6, 9 and 10 positions. As an intermediate in the reaction esters of formic acid are thought to form and any of these remaining in the product after reaction can be converted to the desired hexaol product by saponification under suitable conditions. The product can be separated from the reaction mixture by extraction with a suitable solvent such as ethyl acetate.

For carrying out the reaction, performic acid is prepared by mixing aqueous hydrogen peroxide with aqueous formic acid. The hydrogen peroxide is used in amount such that the molar ratio of the resulting performic acid to the cyclododecatriene being treated is substantially in excess of 3 to 1. The prepared performic acid solution is warmed to a temperature preferably below 50° C. and the triene is then slowly added thereto while the mixture is stirred. Since the resulting reaction is exothermic, it is desirable to employ cooling means to maintain the temperature within the range of 30–60° C. and more preferably at about 40–50° C. in order to minimize the extent of undesirable reactions. A time of reaction generally in excess of one hour should be permitted and considerably longer times, say up to 30 hours, can be utilized to insure completion of the reaction.

After the reaction has been completed, the mixture should be treated with an aqueous solution of a strong alkali to decompose excess performic acid. By employing suitable saponifying conditions in this treatment, any formic acid esters which may have been formed can be converted to the hexaol by saponification to increase its yield.

Following the treatment with alkali, the desired hexaol product can be separated by extracting the reaction mixture with ethyl acetate and then evaporating the solvent. The resulting hexaol product is a clear, viscous liquid which will become converted to a glassy solid if allowed to stand for a number of days.

The hexaol compound so prepared can be used to prepare an explosive by conversion into the hexanitrate of cyclododecane in a manner similar to the known preparation of nitroglycerin from glycerin. Such procedure is set forth in "Encyclopedia of Chemical Technology," Vol. 6, pages 28–30 and need not be described herein. The resulting hexanitrate product has explosive properties and is particularly useful in combination with other explosive nitrate compounds which contain more oxygen than is needed for complete combustion, for example, nitroglycerin or nitrate esters of polyhydroxy compounds such as sorbitol and inisatol. The hexaol product of the invention can also be converted to the acetate ester which is useful as a plasticizer for polyvinyl chloride. The hexaol itself has utility as a chelating agent for metals.

The following example specifically illustrates the preparation of the novel hexaol of the present invention:

A performic acid solution was made by adding 70 ml. of aqueous $H_2O_2$ (30%) to 300 ml. of aqueous formic acid (88%). The solution was heated to about 40° C. and 29.4 g. of cyclododecatriene-1,5,9 was slowly added while the mixture was being stirred. The stated amounts of ingredients resulted in a molar ratio of performic acid to the triene in excess of 3 to 1. The temperature was maintained in the range of 40–45° C. and the mixture was stirred for a period of 90 minutes. It was then placed under a vacuum and held at a temperature of 45–50° C. to remove formic acid and most of the water. The performic acid remaining in the mixture was decomposed by adding an ice cold solution composed of 40 g. NaOH in 75 ml. water. The solution was then warmed to 45° C. and extracted with 175 ml. ethyl acetate. Such extraction was repeated three more times using the same amount of ethyl acetate each time. The solvent was then removed from the combined extract by evaporation under vacuum. A clear, viscous product was obtained in amount of 19 g. (40% of theoretical yield). Analysis showed the product to contain 34.0% oxygen, which compares with a theoretical value of 36.4% for hexahydroxycyclododecane. The product had a bromine number of about 2, indicating that reaction had occurred at substantially all of the double bonds. The infrared spectrum of the product showed an intense hydroxyl band and indicated that a minor amount of the material was probably formate esters of the hexaol. Upon standing for about two weeks, the product had turned into a glassy solid.

I claim:
1. Method of preparing 1,2,5,6,9,10-hexahydroxycyclododecane which comprises reacting performic acid with cyclododecatriene-1,5,9 in amount such that the molar ratio of performic acid to said triene is in excess of 3 to 1, and separating 1,2,5,6,9,10-hexahydroxycyclododecane from the reaction mixture.
2. Method according to claim 1 wherein the reaction is carried out at a temperature in the range of 30–60° C.
3. Method according to claim 1 wherein the reaction is carried out at a temperature in the range of 40–50° C.
4. As a composition of matter, 1,2,5,6,9,10-hexahydroxycyclododecane.

References Cited in the file of this patent

UNITED STATES PATENTS

| | | |
|---|---|---|
| 2,500,599 | Bergsteinsson et al. | Mar. 14, 1950 |
| 2,686,209 | Reed | Aug. 10, 1954 |